(12) United States Patent
Kole et al.

(10) Patent No.: US 12,552,085 B2
(45) Date of Patent: Feb. 17, 2026

(54) Z-CHANNELING INTO A PREFORM VIA NEEDLE PERFORATION IN A STAND-ALONE TOOL

(71) Applicant: RTX Corporation, Farmington, CT (US)

(72) Inventors: Molly Kole, Hartford, CT (US); John D. Riehl, Hebron, CT (US); Olivier H. Sudre, Glastonbury, CT (US); Zachary Paul Konopaske, West Hartford, CT (US); Brendan Lenz, North Branford, CT (US); Nitin Garg, Avon, CT (US); Nil Parikh, Newington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/491,569

(22) Filed: Oct. 20, 2023

(65) Prior Publication Data

US 2025/0128466 A1    Apr. 24, 2025

(51) Int. Cl.
*B29C 51/00* (2006.01)
*B29C 51/26* (2006.01)
(Continued)

(52) U.S. Cl.
CPC .......... *B29C 51/008* (2013.01); *B29C 51/004* (2013.01); *B29C 51/262* (2013.01);
(Continued)

(58) Field of Classification Search
CPC ..... B29C 51/008; B29C 51/09; B29C 51/262; B29C 51/471; B29C 2029/00; B29K 2309/04
(Continued)

(56) References Cited

U.S. PATENT DOCUMENTS

| | | | |
|---|---|---|---|
| 2,289,177 | A | 7/1942 | Jermain |
| 2,611,434 | A | 9/1952 | Mugler |

(Continued)

FOREIGN PATENT DOCUMENTS

| | | |
|---|---|---|
| CN | 108215246 A | 6/2018 |
| EP | 2067757 B1 | 1/2013 |
| EP | 4344843 A1 | 4/2024 |

OTHER PUBLICATIONS

Extended European Search Report for EP Application No. 24201100.5, dated Feb. 19, 2025, 7 pages.

(Continued)

*Primary Examiner* — Christina A Johnson
*Assistant Examiner* — Xue H Liu
(74) *Attorney, Agent, or Firm* — Kinney & Lange, P.A.

(57) ABSTRACT

A method of forming z-channels in a fibrous ceramic preform includes mounting the preform in a tooling assembly, the tooling assembly comprising a first fixture and a second fixture, heating the preform mounted in the tooling assembly to a temperature above a glass transition temperature of a polymer binder within the preform to induce a softened state of the polymer binder, inserting a plurality of needles sequentially through respective first holes in the first fixture, the preform, and respective corresponding second holes in the second fixture, and removing the plurality of needles leaving behind a corresponding plurality of z-channels in the preform.

19 Claims, 3 Drawing Sheets

(51) Int. Cl.
*B29C 51/42* (2006.01)
*B29K 29/00* (2006.01)
*B29K 309/04* (2006.01)

(52) U.S. Cl.
CPC ........ *B29C 51/421* (2013.01); *B29K 2029/00* (2013.01); *B29K 2309/04* (2013.01)

(58) Field of Classification Search
USPC ........................................................ 264/320
See application file for complete search history.

(56) References Cited

U.S. PATENT DOCUMENTS

| | | | |
|---|---|---|---|
| 4,486,372 A | 12/1984 | Millard et al. | |
| 4,923,547 A * | 5/1990 | Yamaji | D04H 1/558 |
| | | | 156/181 |
| 5,066,442 A | 11/1991 | Gutowski et al. | |
| 5,188,625 A | 2/1993 | Van et al. | |
| 5,246,520 A | 9/1993 | Scanlon et al. | |
| 5,372,494 A | 12/1994 | Vaughan | |
| 5,372,668 A | 12/1994 | Bracesco | |
| 5,560,881 A | 10/1996 | Hillman et al. | |
| 5,580,505 A | 12/1996 | Carswell | |
| 5,740,593 A | 4/1998 | Sheehan et al. | |
| 6,083,436 A | 7/2000 | Thompson et al. | |
| 6,190,602 B1 | 2/2001 | Blaney et al. | |
| 6,203,738 B1 | 3/2001 | Vaders | |
| 7,332,116 B2 | 2/2008 | Petervary et al. | |
| 7,576,035 B2 | 8/2009 | Ohno et al. | |
| 7,993,477 B2 | 8/2011 | Hethcock et al. | |
| 7,997,891 B2 | 8/2011 | Gallagher et al. | |
| 8,128,775 B2 | 3/2012 | Maheshwari et al. | |
| 8,216,641 B2 | 7/2012 | Bouchard et al. | |
| 9,017,761 B2 | 4/2015 | La Forest et al. | |
| 9,546,438 B2 | 1/2017 | Fiala | |
| 10,005,246 B2 | 6/2018 | Stepanski | |
| 10,774,005 B2 | 9/2020 | Propheter-hinckley | |
| 11,608,748 B2 | 3/2023 | Liles et al. | |
| 11,648,740 B2 | 5/2023 | Most et al. | |
| 11,655,193 B2 | 5/2023 | Diss et al. | |
| 2003/0121380 A1 | 7/2003 | Cowell et al. | |
| 2003/0136502 A1 | 7/2003 | Lavasserie et al. | |
| 2014/0260438 A1 | 9/2014 | Matsumura | |
| 2016/0046085 A1 * | 2/2016 | Collart | B29C 70/345 |
| | | | 425/290 |
| 2019/0283271 A1 | 9/2019 | Tsuru et al. | |
| 2022/0356125 A1 | 11/2022 | Fernandez | |
| 2023/0193772 A1 | 6/2023 | Wang et al. | |
| 2023/0391680 A1 | 12/2023 | Callaway et al. | |
| 2024/0109223 A1 * | 4/2024 | Lenz | C04B 35/6342 |
| 2024/0300142 A1 | 9/2024 | White et al. | |
| 2024/0300861 A1 | 9/2024 | Konopaske et al. | |
| 2024/0308921 A1 * | 9/2024 | Lenz | C04B 35/80 |
| 2024/0308922 A1 | 9/2024 | Kole et al. | |
| 2024/0344255 A1 | 10/2024 | Fernandez | |
| 2025/0128466 A1 | 4/2025 | Kole et al. | |

OTHER PUBLICATIONS

Extended European Search Report for EP Application No. 24201195.5, dated Mar. 18, 2025, 7 pages.

\* cited by examiner

Z-CHANNELING INTO A PREFORM VIA NEEDLE PERFORATION IN A STAND-ALONE TOOL

BACKGROUND

The present invention relates to the fabrication of ceramic matrix composites (CMCs) and, more particularly, to CMCs having improved properties for operating in gas turbine engines.

In the processing of CMCs, there is a need to infiltrate matrix within and around fibrous tow bundles to replace pore volume with dense matrix material. In a woven system, large voids often exist between adjacent tows of a preform. Such voids can become large defects after infiltration of the composite that are detrimental to composite properties. The pore network through a woven system is often highly tortuous for infiltrating reactant gases, which leads to uneven deposition through the thickness of the preform. The formation of z-channels can create more direct pathways for reactant gases, improving densification.

SUMMARY

A method of forming z-channels in a fibrous ceramic preform includes mounting the preform in a tooling assembly, the tooling assembly comprising a first fixture and a second fixture, heating the preform mounted in the tooling assembly to a temperature above a glass transition temperature of a polymer binder within the preform to induce a softened state of the polymer binder, inserting a plurality of needles sequentially through respective first holes in the first fixture, the preform, and respective corresponding second holes in the second fixture, and removing the plurality of needles leaving behind a corresponding plurality of z-channels in the preform.

Figure 1:
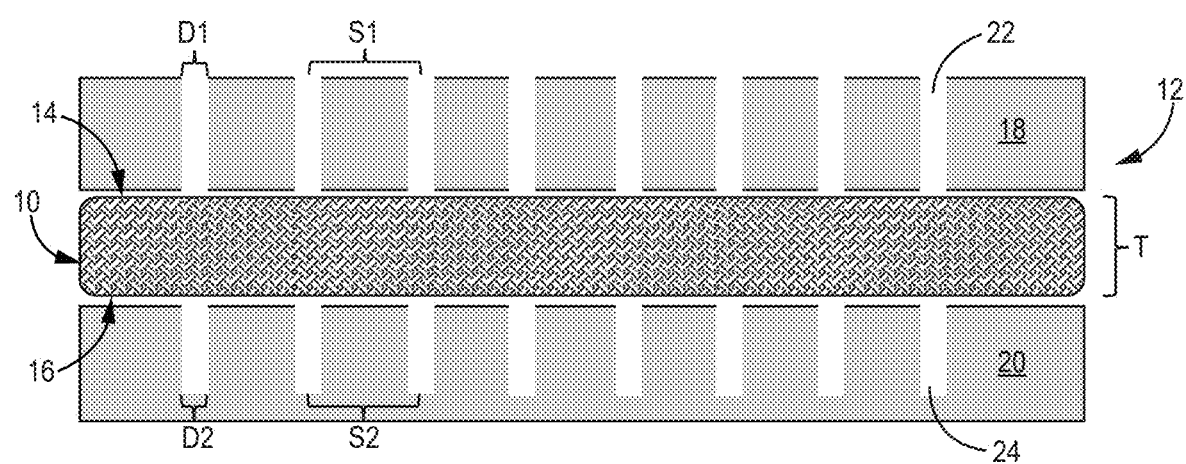
FIG. 1 is a simplified cross-sectional view of a preform mounting within a tooling assembly.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents means for forming z-channels within a fibrous preform, using a stand-alone tooling assembly optimized for z-channeling. Z-channels provide a more direct path for reactant vapors into the thickness of the preform, allowing for a denser, more uniform matrix.

FIG. 1 is a simplified cross-sectional view of a portion of preform 10 mounted within tooling assembly 12. The portion of preform 10 shown in FIG. 1 can be part of a larger, planar (i.e., panel) preform, or a more complexly shaped preform such as an airfoil or seal assembly. Preform 10 can be formed from tows of ceramic (e.g., silicon carbide) fibers arranged in one of various two or three-dimensional woven architectures such as plain, harness (e.g., 3, 5, 8, etc.), twill, or non-symmetric to name a few non-limiting examples. Non-woven architectures (e.g., chopped, felted, etc.) are also contemplated herein. Preform 10 includes first surface 14, second surface 16, and thickness T defined there between. As shown, first surface 14 can be an outer surface, and second surface 16 can be an inner/backside surface. Tooling assembly 12 includes first fixture 18 and second fixture 20. Based on the orientation of preform 10, first fixture 18 can be an outer fixture, and second fixture 20 can be an inner fixture. In some cases, such as if preform 10 is or includes an airfoil, second, inner fixture 20 can be a mandrel over which preform 10 is laid up. In an alternative embodiment tooling assembly 12 can include more than two fixtures, for example, having third, fourth, or fifth fixtures depending on the size or complexity of preform 10.

Tooling assembly 12 can be entirely, or at least partially, a stand-alone tooling assembly for z-channel formation in preform 10. First, each of first fixture 18 and second fixture 20 include holes 22 and 24, respectively, which are each sized and shaped to receive a needle 26 (shown and labeled in FIG. 2). For example, holes 22 can be generally cylindrical with a first diameter D1, and holes 24 can be similarly cylindrical with a second diameter D2. It should be noted that holes 22 and/or 24 need not necessarily be cylindrical in order to receive a respective needle 26, but can have other geometries with curved and/or straight edges. Generally, D1 and D2 are equal, but D2 can be less than D1 in some embodiments. Diameters D1 and/or D2 can range from 0.075 in to 0.125 in (1.905 mm to 3.175 mm). It should be noted that diameters D1 and D2 can be larger than the diameter of an individual needle 26, as well as the resulting, pre-densification diameters of corresponding z-channels (shown and labeled in FIG. 2).

Each hole 22 of first fixture 18 is sufficiently aligned with a respective hole 24 within second fixture 20 that needle 26 can be inserted completely through thickness T of preform 10. Holes 22 can be through-holes, such that they extend completely through first fixture 18, and holes 24 can be pockets, as shown, or through-holes in an alternative embodiment. Pockets can be suitable for receiving a needle 26, and through-holes can be suitable for allowing a needle 26 to extend completely through second fixture 20. Second, holes 22 and 24 can be spaced apart from an adjacent hole 22 and 24 a distance S1 and S2, respectively, which can be equal to one another based on the alignment of holes 22 with holes 24. S1 and S2 can each range from 0.050 in to 0.250 in (1.27 mm to 6.35 mm), as measured from the center of one hole 22, 24 to the center of an adjacent hole 22, 24. As such, hole design for tooling assembly 12 is optimized for needle 26 insertion, as well as z-channel design and location within preform 10, whereas other types of tooling (e.g., graphite reactor tooling) can have holes optimized for allowing reactant gases to infiltrate a preform. Further, first fixture 18 and second fixture 20 can each be formed from an additively or traditionally manufactured plastic or metallic material, which can be more cost efficient than traditional graphite fixtures. In some embodiments, such as if second fixture 20 is a mandrel, tooling assembly 12 can be a partially stand-alone tooling assembly in that a mandrel can be graphite suitable for use in a reactor during densification, and first fixture 18 can be plastic or metal.

Figure 2:
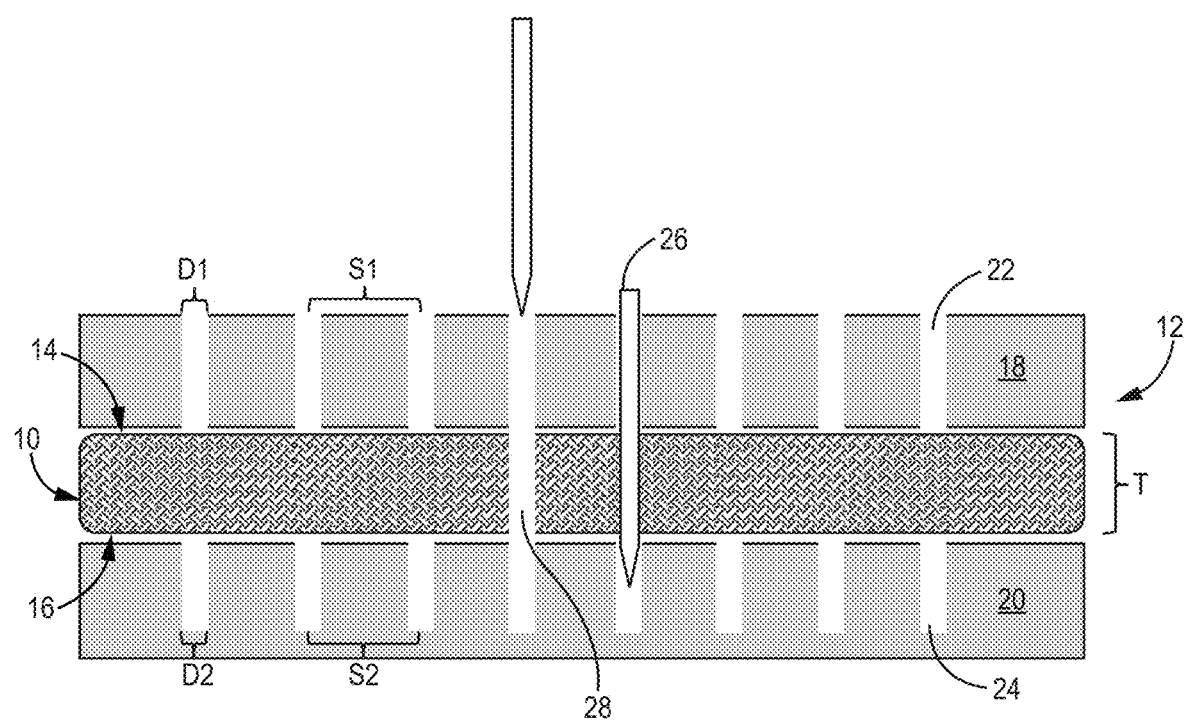
FIG. 2 is a simplified cross-sectional view of the preform and tooling assembly of FIG. 1 showing needles used to form z-channels in the preform.

FIG. 2 is a simplified cross-sectional view of preform 10 mounted within tooling assembly 12 further showing multiple needles 26, one needle 26 is shown inserted in preform 10, illustrating its extent through tooling assembly 12 and preform 10, while another needle 26 is shown removed from preform 10 to illustrate the resulting z-channel 28. It should be understood that insertion of needles 26 can be carried out individually and/or simultaneously, as discussed below. As such, there may or may not be unoccupied pairs of holes 22 and 24, as illustrated in FIG. 2.

Each needle 26 can be generally cylindrical with a pointed tip. Each needle 26 can further be formed from a metallic material or a ceramic material, such as silicon carbide or yttria stabilized zirconia. Metallic needles 26 can further be coated with a polymer material or ceramic (e.g., silicon carbide) in order to minimize metallic contaminants within preform 10 caused by the insertion and removal of needles 26. Polymer contaminants (i.e., from a coating) can be thermally decomposed prior to densification of preform 10, while ceramic contaminants (i.e., from a coating or ceramic needle 26) can remain within the resulting CMC component. Needles 26 can be individually and/or sequentially inserted through tooling assembly 12, or simultaneously inserted (e.g., as an array of needles 26). Either method can be done manually or robotically. Removal of needles 26 can also be done sequentially or simultaneously, as well as manually or robotically.

Figure 3:
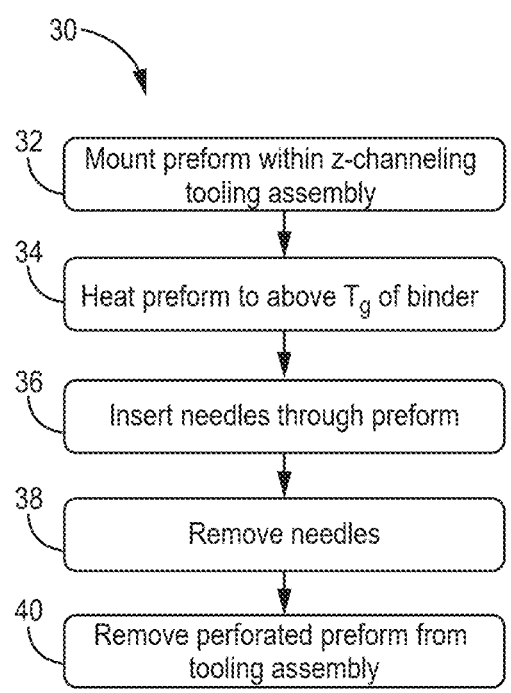
FIG. 3 is a method flowchart illustrating the steps of a first method used for forming z-channels in the preform of FIGS. 1 and 2.

FIG. 3 is a flow chart illustrating steps 32-40 of method 30 for perforating preform 10 using tooling assembly 12. Steps 32-40 are discussed together with continued reference to FIGS. 1 and 2.

At step 32, preform 10 can be mounted within tooling assembly 12. If not already laid up around second (i.e., mandrel) fixture 20, first fixture 18 and second fixture 20 can be secured around preform 10. In some cases, step 32 can include securing first fixture 18 to second fixture 20 using suitable means, such as fasteners, clamps, clips, lids etc.

At step 34, preform 10 can be heated to facilitate insertion of needles 26. Prior to step 32, preform 10 can have been stabilized with a polymer binder, such as polyvinyl butyral (PVB) or polyvinyl alcohol (PVA). Stabilization can occur when a solution or slurry containing the polymer binder is dried to remove any liquid components. As such, step 34 can, in an exemplary embodiment, include heating preform 10 to a temperature exceeding the glass transition temperature ($T_g$) of the polymer binder, the temperature at which the polymer binder becomes soft and flexible, rather than hard and brittle. For PVB, a suitable temperature can range from 250° F. to 350° F. (121.1° C. to 176.7° C.). When the appropriate $T_g$ is reached, the binder softens and facilitates the subsequent insertion of needles 26 through preform 10.

At step 36, needles 26 can be inserted through preform 10 while the binder is still in a softened state. Each needle 26 is preferably inserted completely through thickness T of preform 10. The softened state of the polymer binder caused by the heating of step 34 helps each needle 26 move through preform 10 with less resistance (e.g., from friction) and mitigates fiber breakage. Stated another way, individual preform fibers are more likely to be pushed away by a needle 26 rather than damaged or broken when the polymer binder is in a softened state. In general, step 36 can proceed until a needle 36 is inserted through/into each pair of corresponding holes 22, 24 in first fixture 18 and second fixture 20, respectively.

At step 38, needles 26 can be removed from preform 10, leaving behind a "perforated" preform 10 with z-channels 28. In an exemplary embodiment, needles 26 can be removed after the polymer binder cools to below its $T_g$, which has shown to produce z-channels 28 with cylindrical geometries corresponding to needles 26. Alternatively, needles 26 can be removed immediately after insertion, that is, when the polymer binder is still at or above its $T_g$. With the latter approach, needles 26 may be easier to remove, but the resulting z-channels may deform/collapse slightly as the polymer binder cools.

At step 40, perforated preform 10 can be removed from tooling assembly 12 to undergo further processing (e.g., debulking, deposition of interface coatings, etc.) prior to densification with a ceramic (e.g., silicon carbide) matrix via chemical vapor infiltration (CVI) or other methodology, such as melt infiltration or polymer infiltration and pyrolysis. In an embodiment in which second fixture 20 is a graphite mandrel, only first fixture 18 need be removed, and preform 10 can stay mounted on second fixture 20 during densification. CMC components fabricated using tooling assembly 12 and needles 26 can be incorporated into aerospace, maritime, or industrial equipment, to name a few, non-limiting examples.

Discussion of Possible Embodiments

The following are non-exclusive descriptions of possible embodiments of the present invention.

A method of forming z-channels in a fibrous ceramic preform includes mounting the preform in a tooling assembly, the tooling assembly comprising a first fixture and a second fixture, heating the preform mounted in the tooling assembly to a temperature above a glass transition temperature of a polymer binder within the preform to induce a softened state of the polymer binder, inserting a plurality of needles sequentially through respective first holes in the first fixture, the preform, and respective corresponding second holes in the second fixture, and removing the plurality of needles leaving behind a corresponding plurality of z-channels in the preform.

The method of the preceding paragraph can optionally include, additionally and/or alternatively, any one or more of the following features, configurations and/or additional steps:

The above method can further include removing at least the first fixture from the preform.

Any of the above methods can further include removing the first fixture and the second fixture from preform.

A method of forming a ceramic matrix composite can include densifying the preform of any of the above methods with a ceramic matrix.

In any of the above methods, the ceramic matrix can include silicon carbide.

In any of the above methods, the preform can include fibers formed from silicon carbide.

In any of the above methods, each of the first fixture and the second fixture can be formed from one of plastic and metal.

In any of the above methods, the first fixture can be formed from one of plastic and metal, and the second fixture can be formed from graphite.

In any of the above methods, the polymer binder can be polyvinyl butyral.

In any of the above methods, the step of heating the preform can include heating the preform to a temperature ranging from 250° F. to 350° F.

In any of the above methods, the step of inserting the plurality of needles can be performed while the polymer binder is in the softened state.

In any of the above methods, the step of removing the plurality of needles can be performed when the polymer binder is in the softened state.

In any of the above methods, the step of removing the plurality of needles can be performed when a temperature of the polymer binder is below the glass transition temperature.

In any of the above methods, the step of inserting the plurality of needles can include sequentially or simultaneously inserting each of the plurality of needles.

In any of the above methods, the step of removing the plurality of needles can include sequentially or simultaneously removing each of the plurality of needles.

In any of the above methods, the step of inserting the plurality of needles can include manually or robotically inserting each of the plurality of needles.

In any of the above methods, each of the first holes in the first fixture can have a first diameter, and wherein each of the second holes in the second fixture can have a second diameter.

In any of the above methods, at least one of the first diameter and the second diameter can range from 0.075 in to 0.125 in.

In any of the above methods, at least one of the first holes in the first fixture can be spaced apart from an adjacent hole in the first fixture a distance ranging from 0.050 in to 0.250 in.

In any of the above methods, at least one of the second holes in the second fixture can be spaced apart from an adjacent hole in the second fixture a distance ranging from 0.050 in to 0.250 in.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming z-channels in a fibrous ceramic preform, the method comprising:
   mounting the preform in a tooling assembly, the tooling assembly comprising:
   a first fixture formed from plastic; and
   a second fixture formed from graphite;
   heating the preform mounted in the tooling assembly to a temperature above a glass transition temperature of a polymer binder within the preform to induce a softened state of the polymer binder;
   inserting a plurality of needles sequentially through respective first holes in the first fixture, the preform, and respective corresponding second holes in the second fixture; and
   removing the plurality of needles leaving behind a corresponding plurality of z-channels in the preform.

2. The method of claim 1 and further comprising: removing at least the first fixture from the preform.

3. The method of claim 2 and further comprising: removing the first fixture and the second fixture from preform.

4. A method of forming a ceramic matrix composite component, the method comprising:
   densifying the preform of claim 2 with a ceramic matrix.

5. The method of claim 4, wherein the ceramic matrix comprises silicon carbide.

6. The method of claim 4, wherein the preform comprises fibers formed from silicon carbide.

7. The method of claim 1, wherein the polymer binder is polyvinyl butyral.

8. The method of claim 7, wherein the step of heating the preform comprises heating the preform to a temperature ranging from 250° F. to 350° F.

9. The method of claim 1, wherein the step of inserting the plurality of needles is performed while the polymer binder is in the softened state.

10. The method of claim 9, wherein the step of removing the plurality of needles is performed when the polymer binder is in the softened state.

11. The method of claim 9, wherein the step of removing the plurality of needles is performed when a temperature of the polymer binder is below the glass transition temperature.

12. The method of claim 1, wherein the step of inserting the plurality of needles comprises sequentially inserting each of the plurality of needles.

13. The method of claim 1, wherein the step of removing the plurality of needles comprises sequentially or simultaneously removing each of the plurality of needles.

14. The method of claim 1, wherein the step of inserting the plurality of needles comprises manually or robotically inserting each of the plurality of needles.

15. The method of claim 1, wherein each of the first holes in the first fixture has a first diameter, and wherein each of the second holes in the second fixture has a second diameter.

16. The method of claim 15, wherein at least one of the first diameter and the second diameter ranges from 0.075 in to 0.125 in.

17. The method of claim 1, wherein at least one of the first holes in the first fixture is spaced apart from an adjacent hole in the first fixture a distance ranging from 0.050 in to 0.250 in.

18. The method of claim 1, wherein at least one of the second holes in the second fixture is spaced apart from an adjacent hole in the second fixture a distance ranging from 0.050 in to 0.250 in.

19. The method of claim 1, wherein the second fixture is a mandrel and wherein the preform is laid up over the mandrel.

* * * * *